United States Patent
Sweney et al.

(10) Patent No.: US 8,897,959 B1
(45) Date of Patent: Nov. 25, 2014

(54) FEEDBACK SYSTEM FOR ELECTRIC MOTORCYCLES

(71) Applicant: Faster Faster, Inc., San Francisco, CA (US)

(72) Inventors: Robert W. Sweney, San Francisco, CA (US); Derek Dorresteyn, Mill Valley, CA (US); Christopher Charles Blain, Sausalito, CA (US)

(73) Assignee: Faster Faster, Inc., San Francisco, CA (US)

( * ) Notice: Subject to any disclaimer, the term of this patent is extended or adjusted under 35 U.S.C. 154(b) by 0 days.

(21) Appl. No.: 13/777,905

(22) Filed: Feb. 26, 2013

(51) Int. Cl.
G05B 11/01 (2006.01)

(52) U.S. Cl.
CPC .................................... *G05B 11/01* (2013.01)
USPC .......................................................... 701/36

(58) Field of Classification Search
CPC ...................................................... B60Q 5/008
USPC ........................................................... 701/36
See application file for complete search history.

(56) References Cited

U.S. PATENT DOCUMENTS

| | | | |
|---|---|---|---|
| 4,325,199 A * | 4/1982 | McEdwards | 446/130 |
| 5,771,475 A * | 6/1998 | Tabata et al. | 701/22 |
| 5,908,453 A * | 6/1999 | Tabata et al. | 701/22 |
| 7,053,289 B2 * | 5/2006 | Iwai et al. | 84/600 |
| 8,164,429 B2 * | 4/2012 | Reynolds et al. | 340/425.5 |
| 8,204,243 B2 * | 6/2012 | Smith | 381/86 |
| 2004/0170288 A1 * | 9/2004 | Maeda | 381/86 |
| 2010/0166210 A1 * | 7/2010 | Isozaki | 381/86 |
| 2012/0081222 A1 * | 4/2012 | Tamaki et al. | 340/466 |
| 2012/0130580 A1 * | 5/2012 | Omote et al. | 701/22 |
| 2013/0282218 A1 * | 10/2013 | Matsuda | 701/22 |

OTHER PUBLICATIONS

Beeler, R., "The Four Killer Apps of the Electric Motorcycle," AsphaltandRubber.com, Jul. 3, 2012, 17 Pages, [online] [retrieved on Jun. 10, 2013] Retrieved from the internet <http://www.asphaltandrubber.com/oped/electric-motorcycle-killer-apps/>.

* cited by examiner

*Primary Examiner* — Thomas Tarcza
*Assistant Examiner* — Alex C Dunn
(74) *Attorney, Agent, or Firm* — Fenwick & West LLP

(57) ABSTRACT

The embodiments herein describe a feedback system for an electric motorcycle. The feedback system notifies a user of the electric motorcycle of various conditions of the electric motorcycle via one or more output devices. In one embodiment, the feedback system causes a throttle mechanism of the electric motorcycle to vibrate in response to the electric motorcycle being in an on state.

17 Claims, 5 Drawing Sheets

FEEDBACK SYSTEM FOR ELECTRIC MOTORCYCLES

FIELD OF THE TECHNOLOGY

The embodiments discussed herein relate generally to electric motorcycles, and more particularly to a feedback system for electric motorcycles.

BACKGROUND

An electric vehicle such as an electric motorcycle produces almost no sound (i.e., idling noise from a combustion engine) or vibration when not in motion (even when powered on) compared to vehicles with an internal combustion engine. When a gasoline-powered motorcycle is powered on, people are aware that the motorcycle is on due to the sound it produces, even at idle state. Thus, people are more cautious when touching the throttle of gasoline powered motorcycles when the motorcycles are turned on.

In contrast, people may not realize that the throttle of an electric motorcycle is "live" because of the limited sound produced by the electric motorcycle when powered on. People unaware that the electric motorcycle is on may touch the throttle of the motorcycle (e.g., rev the engine) believing that the electric motorcycle is turned off. This may result in the electric motorcycle inadvertently driving off without a person controlling the motorcycle. Thus, conventional electric motorcycles lack inherent cues (e.g., engine noise) that indicate when the electric motorcycles are powered on.

SUMMARY

The embodiments herein describe a feedback system for an electric motorcycle that notifies a user of various conditions of the motorcycle. The conditions of the electric motorcycle may include for example the state of the motorcycle (e.g., on or off), speed, torque, battery charge, traction limit, etc. In one embodiment, conditions of the electric motorcycle may each be associated with a feedback policy. The feedback policy for an associated condition may describe a type of feedback to provide to a user to alert the user of the condition. When a condition occurs, the electric motorcycle provides feedback to a user of the electric motorcycle via an output device according to a feedback policy associated with the condition.

In one embodiment, if the electric motorcycle is turned on, the feedback system may produce a vibration at a throttle mechanism of the electric motorcycle. By applying a vibration to the throttle mechanism when the electric motorcycle is turned on, the feedback system warns users that the throttle mechanism is live thereby minimizing the risk of the users revving the motor of the electric motorcycle unintentionally.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
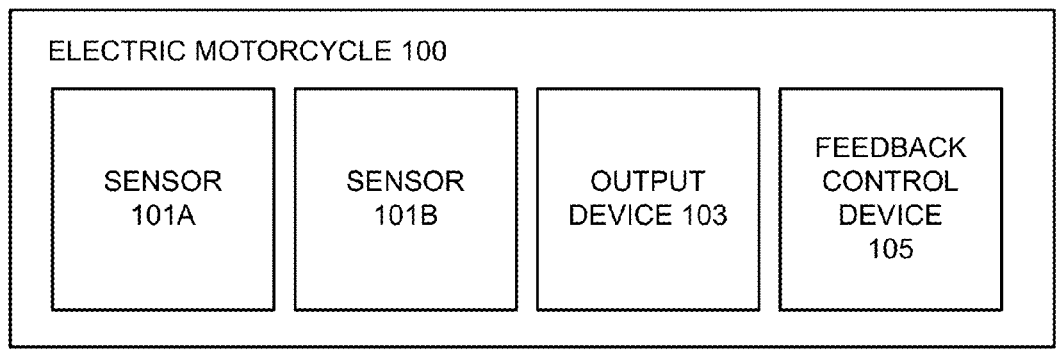
FIG. 1 is a diagram of an electric motorcycle according to one embodiment.

FIG. 1 is a diagram of an electric motorcycle according to one embodiment. Note that the electric motorcycle 100 may include components other than those illustrated in FIG. 1 such as an electric motor, a frame, wheels, tires, and suspension which are omitted for brevity. Furthermore, although the embodiments disclosed herein are described with respect to electric motorcycles, the embodiments may be applied to other forms of electric powered vehicles such as electric cars and/or other forms of vehicles where the throttle is controlled by the hand(s) of a user such as three and four wheel off road vehicles (e.g., all-terrain vehicles (ATVs)).

In one embodiment, the electric motorcycle 100 comprises one or more sensors 101 such as sensor 101A and sensor 101B. Although only two sensors are shown in FIG. 1, the electric motorcycle 100 may have any number of sensors. Each sensor 101 is a device that measures a physical property that indicates a condition of the electric motorcycle 100. The physical properties include state (e.g., whether the electric motor of the motorcycle 100 is on or off), speed, acceleration, throttle position, battery charge, global positioning system (GPS) positions, traction limit, etc. For example, sensor 101A may measure the state of the electric motorcycle 100 (e.g., powered on or powered off) whereas sensor 101B measures the speed of the electric motorcycle 100.

Figure 3:
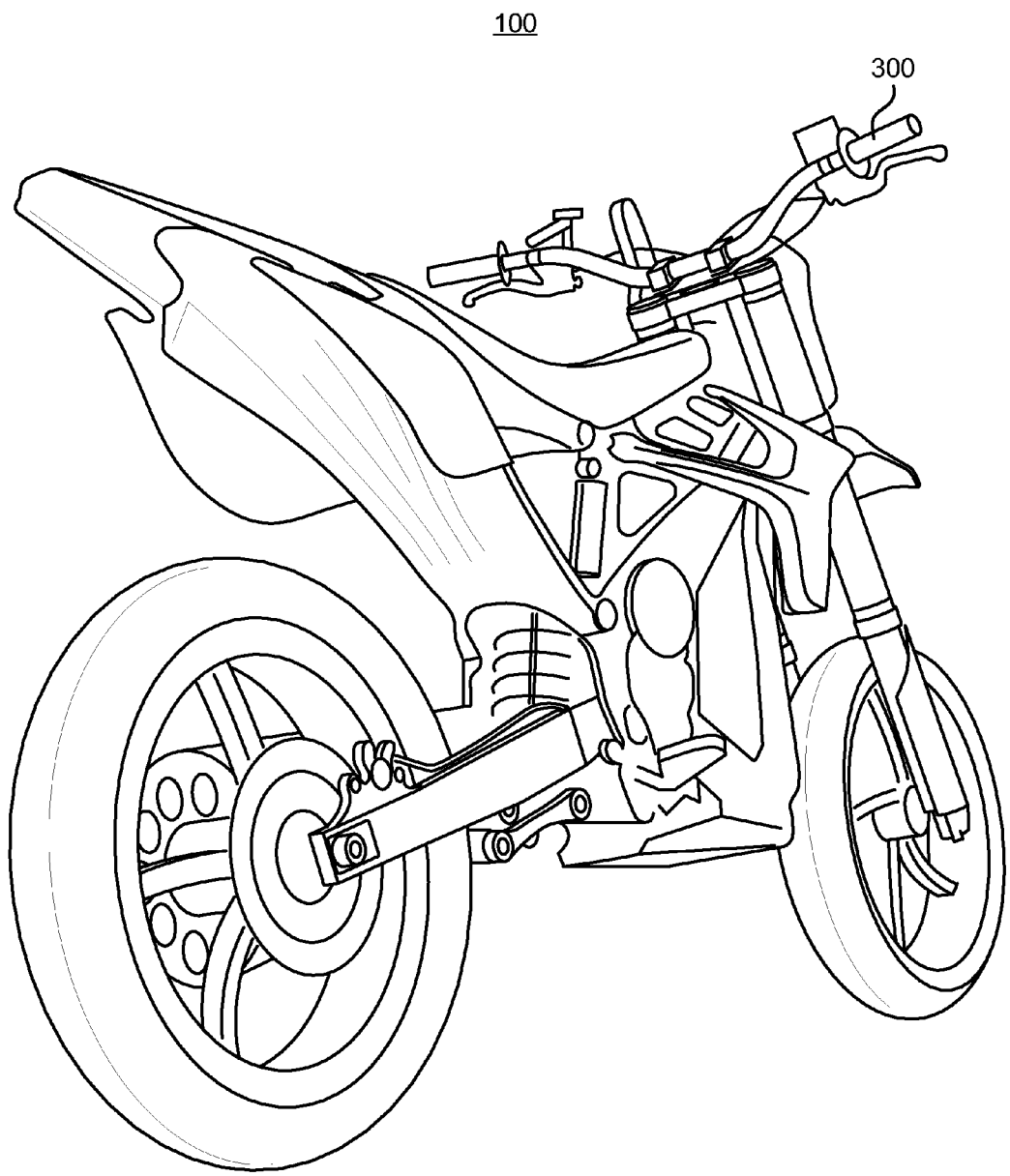
FIG. 3 illustrates a throttle mechanism of the electric motorcycle according to one embodiment.

An output device 103 outputs feedback to a user (e.g., the rider) of the electric motorcycle 100. Although only a single output device 103 is shown, the electric motorcycle 100 can have any number of output devices. In one embodiment, the output device 103 may be a throttle mechanism 300 of the electric motorcycle as shown in FIG. 3. However, the output device 103 may be any device capable of providing notifications to the user via audio, visual, and/or haptic indications. Examples of other output devices include a display screen (e.g., a light emitting diode (LED) display) and/or a light on an instrument cluster of the electric motorcycle or a speaker (s) on the electric motorcycle 100.

Figure 4:
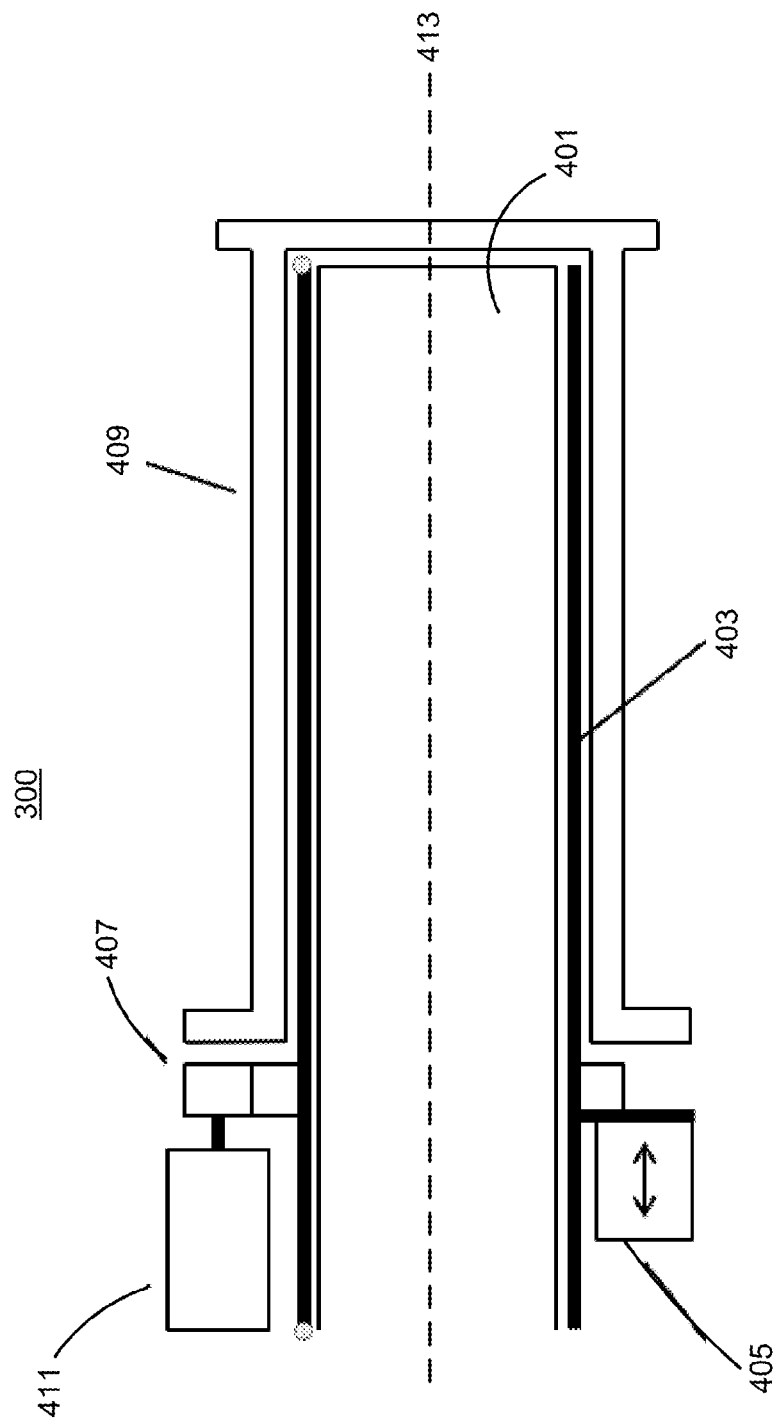
FIG. 4 is a detailed view of the throttle mechanism of the electric motorcycle according to one embodiment.

FIG. 4 is a detailed view of a twist type throttle mechanism 300 of the electric motorcycle according to one embodiment. Note that in other embodiments, thumb-press type throttle mechanisms may be used. The throttle mechanism 300 is coupled to a handlebar 401 of the electric motorcycle 100. In one embodiment, the throttle mechanism 300 includes a sleeve tube 403. The sleeve tube 403 may be made of plastic. The sleeve tube 403 encases the handlebar 401 and rotates about the axis 413 of the handlebar 401. A throttle grip 409 further encases the sleeve tube 403. Thus, both the throttle grip 409 and the sleeve tube 403 rotate together about the axis 413 of the handlebar 401.

In one embodiment, the sleeve tube 403 is coupled to a position sensor 411 (which may represent a sensor 101 from FIG. 1) via gear interface 407. As the sleeve tube 403 rotates around the handle bar 401, gears in the gear interface 407 also rotate based on the rotation of the sleeve tube 403. The position sensor 411 determines the position of the throttle mechanism 300 based on the position of the gears in the gear interface 407 as the gears rotate in correspondence with the rotation of the sleeve tube 403.

As shown in FIG. 4, the throttle mechanism 300 further includes a vibration motor 405. In one embodiment, the vibration motor 405 is a linear vibration motor. The vibration motor 405 vibrates (i.e., oscillates) in the axial direction of the handlebar 401 to produce vibration in the sleeve tube 403 that the user feels through the throttle grip 409. The vibration motor 405 may vibrate in response to a condition of the electric motorcycle 100 such as the motorcycle being in the on state. In other embodiments, the vibration motor 405 may vibrate in the radial or angular direction. The vibration motor 405 may also be fixed to the handlebar 401 rather than the sleeve tube 304 as shown in FIG. 4.

Referring back to FIG. 1, the electric motorcycle 100 includes a feedback control device 105 in one embodiment. The feedback control device 105 determines feedback to provide to the user of the electric motorcycle 100 based on conditions of the electric motorcycle 100. In one embodiment, the feedback control device 103 controls the output device 103 to provide feedback to the user based on the physical properties measured by the sensors 101. The feedback control device 105 may cause the output device 103 to provide different types of feedback based on the conditions indicated by the sensors 101. The feedback control device 105 may use audio, light, vibration or a combination thereof to provide feedback to the user via the output device 103.

Figure 2:
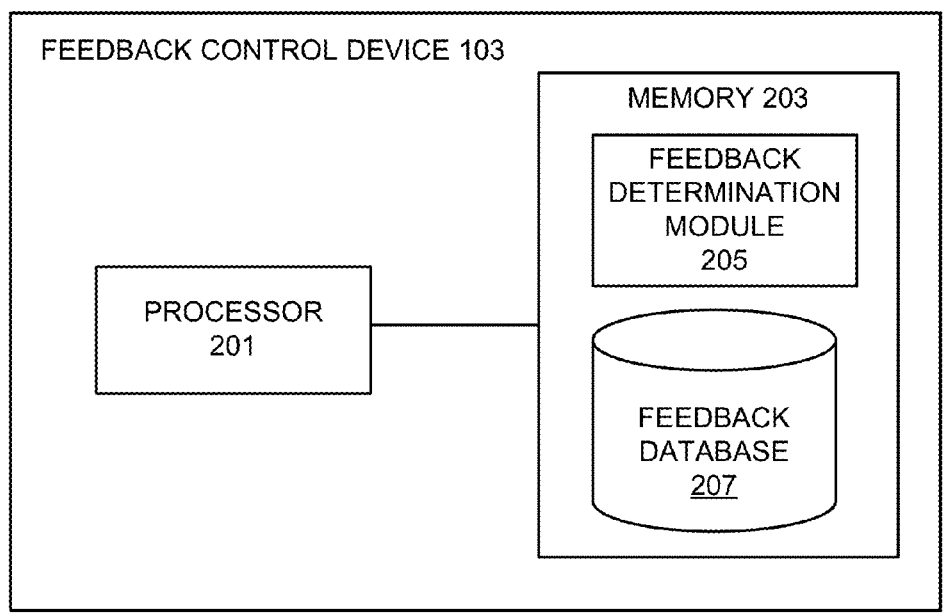
FIG. 2 is a diagram of a feedback control device of the electric motorcycle according to one embodiment.

Referring now to FIG. 2, a detailed view of the feedback control device 105 is shown according to one embodiment. Note that the feedback control device 105 may be implemented using analog circuitry, digital circuitry, or a combination thereof. In the embodiment shown in FIG. 2, the feedback control device comprises a processor 201 and a memory 203. Note that the feedback control device 103 comprises conventional features such as communication interfaces of the sensors 101 and the output device 103. However, the illustration of these conventional features has been omitted for brevity purposes. Note that in other embodiments, the feedback control device 105 may also comprise additional features other than those illustrated in FIG. 2.

In one embodiment, the processor 201 processes data signals (e.g., measurements of the sensors 101) and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processor 201 may comprise an arithmetic logic unit, a microprocessor, a general purpose computer, or some other information appliance equipped to transmit, receive and process electronic data signals from the memory 203, sensors 101, and output device 103.

In one embodiment, the memory 203 stores instructions and/or data that may be executed by processor 201. The instructions and/or data may comprise code (i.e., modules) for performing any and/or all of the techniques described herein. Memory 203 may be any non-transitory computer-readable storage medium such as dynamic random access memory (DRAM) device, a static random access memory (SRAM) device, Flash RAM (non-volatile storage), combinations of the above, or some other memory device known in the art.

In one embodiment, the memory 203 comprises a feedback database 207. The feedback database 207 stores different feedback policies. In one embodiment, each feedback policy describes a type of feedback to provide to the user, the output device 103 to provide the feedback, and a condition of the motorcycle that causes the output of the feedback. As mentioned previously, the types of feedback may include haptic (i.e., vibration) feedback, audio feedback, visual feedback, or combination thereof.

For example, a feedback policy may describe that the throttle mechanism 300 (i.e., an output device) of the electric motorcycle 100 vibrates (i.e., the type of feedback) in response to an indication from a sensor 101 that the motorcycle is turned on (i.e., the condition). The feedback policy may further indicate the duration in which the output device 103 provides the feedback and/or a feedback pattern associated with the feedback.

For example, the feedback policy associated with the on-state of the electric motorcycle 100 may indicate that the throttle mechanism 300 vibrates based on the state and speed of the electric motorcycle 100. In one embodiment, the throttle mechanism 300 vibrates when the electric motorcycle 100 is powered on and at zero speed. The feedback policy may indicate a specific frequency and/or intensity (i.e., the vibration pattern) that is unique to condition of the motorcycle being in the on state at zero speed. The feedback policy may further indicate for the vibration of the throttle mechanism 300 to stop once the electric motorcycle is in motion (i.e., speed greater than zero). By having the throttle vibrate, the vibration indicates a warning to any users that touch the throttle mechanism 300 that the electric motorcycle 100 is turned on. In an alternative embodiment, the throttle mechanism 300 of the electric motorcycle 100 may vibrate during the duration of time in which the electric motorcycle 100 is powered on regardless if the motorcycle is stationary (i.e., zero speed) or moving (i.e., speed greater than zero). The feedback policy may also control other types of indications to inform the user that the electric motorcycle 100 is turned on such as displaying a light on a dashboard of the electric motorcycle and/or producing a sound (e.g., a buzzing noise).

In another example, a feedback policy may describe that the throttle mechanism 300 of the electric motorcycle 100 also vibrates in response to other conditions occurring such as system warnings (e.g., low battery charge) or if a vehicle speed threshold is reached (e.g., 65 MPH) for example. The feedback policy may specify a different frequency and/or intensity in which the throttle mechanism 300 vibrates to distinguish the vibration from the feedback indicating that the electric motorcycle 300 is turned on. The vibration pattern is different enough for a user to easily tell that a different condition is being conveyed to the user via the throttle mechanism 300. Alternatively, the same frequency and/or intensity of vibration may be used to inform the user of the other condition. In the embodiment where the throttle mechanism 300 vibrates during the entire duration that the electric motorcycle is turned on, once the other condition is no longer applicable (e.g., the vehicle speed is below the speed threshold), the vibration of the throttle mechanism 300 associated with the other condition may stop and the vibration associated with the on-state of the motorcycle 100 may resume.

As shown in FIG. 2, the memory 203 also includes a feedback determination module 205. The feedback determination module 203 determines feedback to provide to the user based on the feedback policies stored in the feedback database 207. The feedback determination module 203 receives conditions of the electric motorcycle 100 from sensors 101. The feedback determination module 203 may compare a received condition to the policies in the feedback database 207 to identify a policy associated with the received condition.

The feedback determination module 203 determines from the identified policy the type of feedback to provide to the user and the output device 103 that will be used to provide the feedback. The feedback determination module 203 controls the output device 103 to provide feedback to the user of the electric motorcycle 100 according to the identified policy.

For example, the feedback determination module 203 may receive an indication that the electric motorcycle is turned on and identifies a policy in the feedback database 207 associated with the on condition. From the policy, the feedback determination module 203 determines that the associated feedback is a vibration provided via the throttle mechanism 300 of the electric motorcycle 100. Accordingly, the feedback determination module 205 may send a signal to the throttle mechanism 300 to vibrate according to the identified policy. Specifically, the feedback determination module 205 may send an instruction to the vibration motor 405 to vibrate according to the identified policy indicating to a user that the electric motorcycle is in the on state.

Feedback Determination Method

Figure 5:
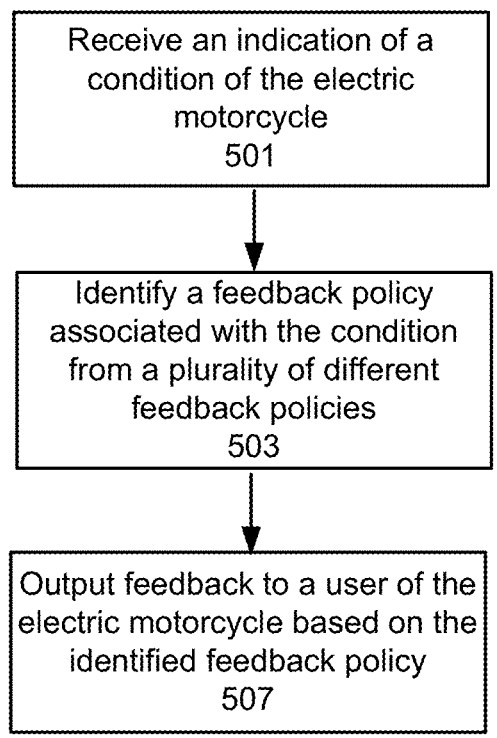
FIG. 5 is a method flow diagram for outputting feedback to a rider of the electric motorcycle according to one embodiment.

Referring now to FIG. 5, there is shown one embodiment for a method for determining feedback to provide to a user of an electric motorcycle 100. Note that in other embodiments, other steps may be performed than those illustrated in FIG. 5.

In one embodiment, the feedback control device 105 receives 501 an indication of a condition of the electric motorcycle 100. The feedback control device 105 may receive the indication from one or more sensors 101 of the electric motorcycle. The indication may be a signal describing a physical quantity measured by the sensor such as the speed of the electric motorcycle 100, state, load on the motor, battery charge, etc.

The feedback control device 105 identifies 501 a feedback policy associated with the received condition from a plurality of different feedback policies. The feedback policy describes a type of feedback to output to the user, an output device to output the feedback, and the associated condition according to one embodiment. The feedback control device 105 communicates with the output device 103 to output 507 feedback to a user of the electric motorcycle 100 based on the identified feedback policy. For example, the feedback control device 105 may control the throttle mechanism 300 of the electric motorcycle 100 to vibrate when the electric motorcycle is on.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments described herein include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the embodiments are not described with reference to any particular programming language. It will be appreciated that a variety of programming languages may be used to implement the teachings of the embodiments as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications of the embodiments have been illustrated and described herein, it is to be understood that the embodiments are not limited to the precise construction and components disclosed herein and that various modifications, changes, and variations may be made in the arrangement, operation, and details of the methods and apparatuses of the embodiments of the present disclosure without departing from the spirit and scope of the disclosure as it is defined in the appended claims.

What is claimed is:

1. A computer-implemented method for providing feedback to a user of an electric motorcycle, the method comprising:
   receiving an indication that the electric motorcycle is turned on;
   in response to the indication, causing vibration at a throttle mechanism of the electric motorcycle while the electric motorcycle is at zero speed to indicate to the user that the electric motorcycle is turned on; and
   halting the vibration at the throttle mechanism in response to the electric motorcycle moving.

2. A computer-implemented method for providing feedback to a user of an electric motorcycle, the method comprising:
   receiving an indication of a condition of the electric motorcycle being turned on;
   accessing a plurality of feedback policies responsive to the indication, each feedback policy describing a type of feedback to provide to the user in response to a corresponding condition of the motorcycle;
   identifying, from the plurality of feedback policies, a feedback policy associated with the condition of the electric motorcycle being turned on, the identified feedback policy describing a vibration type feedback at a throttle mechanism of the electric motorcycle;
   in response to said indication, causing vibration at the throttle mechanism of the electric motorcycle while the electric motorcycle is at zero speed to alert the user of the condition of the electric motorcycle being turned on based on the identified feedback policy; and
   halting the vibration at the throttle mechanism in response to the electric motorcycle moving.

3. The computer-implemented method of claim 2, wherein the feedback policy associated with the condition describes an intensity of the vibration at the throttle mechanism, a frequency of the vibration at the throttle mechanism, and a duration of the vibration at the throttle mechanism.

4. The computer-implemented method of claim 2, further comprising:
   receiving a second indication of a second condition of the electric motorcycle;
   identifying a feedback policy associated with the second condition, the feedback policy describing a vibration type feedback at the throttle mechanism;
   causing a second vibration at the throttle mechanism based on the feedback policy associated with the second condition while the electric motorcycle is moving.

5. The computer-implemented method of claim 2, the method further comprising:
   receiving a second indication of a second condition of the electric motorcycle;
   identifying a feedback policy associated with the second condition, the feedback policy describing a vibration type feedback at the throttle mechanism;
   halting the vibration at the throttle mechanism associated with the condition that the electric motorcycle is turned on;
   causing a second vibration at the throttle mechanism based on the feedback policy associated with the second condition, the second vibration distinct from the vibration indicating that the electric motorcycle is turned on; and
   resuming the vibration at the throttle mechanism while the electric motorcycle is at zero speed, the vibration associated with the condition that the electric motorcycle is turned on.

6. The computer-implemented method of claim 4, wherein the second condition indicates that a speed of the electric motorcycle is above a threshold speed.

7. The computer-implemented method of claim 4, wherein the second condition indicates that a charge of a battery of the electric motorcycle is below a threshold charge.

8. The computer-implemented method of claim 4, wherein the second condition indicates a loss of traction of the electric motorcycle.

9. The computer-implemented method of claim 4, wherein the second condition indicates global positioning system related commands.

10. A computer program product comprising a non-transitory computer readable storage medium storing executable code for providing feedback to a user of an electric motorcycle, the code when executed by a processor performs steps comprising:
    receiving an indication of a condition of the electric motorcycle being turned on;
    accessing a plurality of feedback policies responsive to the indication, each feedback policy describing a type of feedback to provide to the user in response to a corresponding condition of the motorcycle;
    identifying, from the plurality of feedback policies, a feedback policy associated with the condition of the electric motorcycle being turned on, the identified feedback policy describing a vibration type feedback at a throttle mechanism of the electric motorcycle;
    in response to said indication, causing vibration at the throttle mechanism of the electric motorcycle while the electric motorcycle is at zero speed to alert the user of the condition of the electric motorcycle being turned on based on the identified feedback policy; and
    halting the vibration at the throttle mechanism in response to the electric motorcycle moving.

11. The computer program product of claim 10, wherein the feedback policy associated with the condition describes an intensity of the vibration at the throttle mechanism, a frequency of the vibration at the throttle mechanism, and a duration of the vibration at the throttle mechanism.

12. The computer program product of claim 10, wherein the code when executed by the processor performs further steps comprising:
    receiving a second indication of a second condition of the electric motorcycle;
    identifying a feedback policy associated with the second condition, the feedback policy describing a vibration type feedback at the throttle mechanism;
    causing a second vibration at the throttle mechanism based on the feedback policy associated with the second condition while the electric motorcycle is moving.

13. The computer program product of claim 10, wherein the code when executed by the processor performs further steps comprising:
- receiving a second indication of a second condition of the electric motorcycle;
- identifying a feedback policy associated with the second condition, the feedback policy describing a vibration type feedback at the throttle mechanism;
- halting the vibration at the throttle mechanism associated with the condition that the electric motorcycle is turned on;
- causing a second vibration at the throttle mechanism based on the feedback policy associated with the second condition, the second vibration distinct from the vibration indicating that the electric motorcycle is turned on; and
- resuming the vibration at the throttle mechanism while the electric motorcycle is at zero speed, the vibration associated with the condition that the electric motorcycle is turned on.

14. The computer program product of claim 12, wherein the second condition indicates one of the following conditions including a speed of the electric motorcycle is above a threshold speed, a charge of a battery of the electric motorcycle is below a threshold charge, a loss of traction of the electric motorcycle, or global positioning system related commands.

15. An electric motorcycle for providing feedback to a user of the electric motorcycle, the electric motorcycle comprising:
- a sensor configured to provide an indication of a condition of the electric motorcycle being turned on;
- a throttle mechanism including a vibration motor;
- a feedback control device communicatively coupled to the sensor and the throttle mechanism, the feedback control device configured to:
  - receive, from the sensor, the indication of the condition of the electric motorcycle being turned on;
  - access a plurality of feedback policies responsive to the indication, each feedback policy describing a type of feedback to provide to the user in response to a corresponding condition of the motorcycle;
  - identify, from the plurality of feedback policies, a feedback policy associated with the condition of the electric motorcycle being turned on, the identified feedback policy describing a vibration type feedback at the throttle mechanism of the electric motorcycle;
  - in response to said indication, cause the vibration motor to vibrate while the electric motorcycle is at zero speed to alert the user of the condition of the electric motorcycle being turned on based on the identified feedback policy; and
  - halt the vibration at the throttle mechanism in response to the electric motorcycle moving.

16. The electric motorcycle of claim 15, wherein the feedback control device is further configured to:
- receive a second indication of a second condition of the electric motorcycle;
- identify a feedback policy associated with the second condition, the feedback policy describing a vibration type feedback at the throttle mechanism;
- cause a second vibration at the throttle mechanism based on the feedback policy associated with the second condition while the electric motorcycle is moving.

17. The electric motorcycle of claim 16, wherein the second condition indicates one of the following conditions including a speed of the electric motorcycle is above a threshold speed, a charge of a battery of the electric motorcycle is below a threshold charge, a loss of traction of the electric motorcycle, or global positioning system related commands.

* * * * *